(No Model.) 2 Sheets—Sheet 1.
H. MYERS.
HORSE HAY RAKE.
No. 360,039. Patented Mar. 29, 1887.
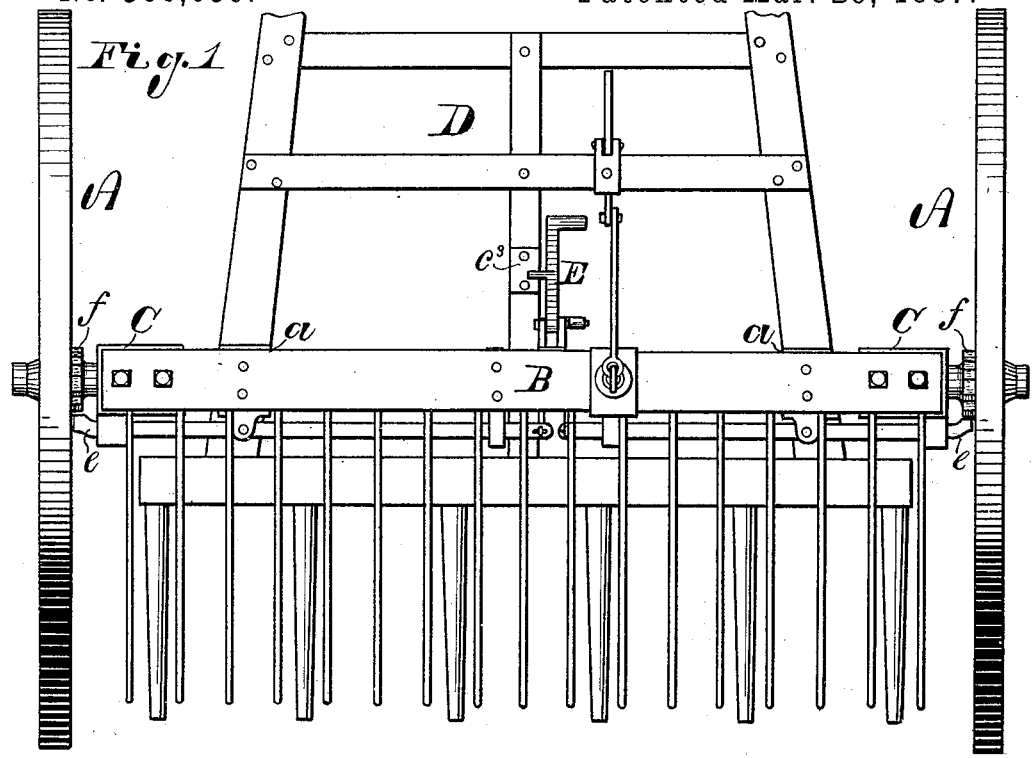
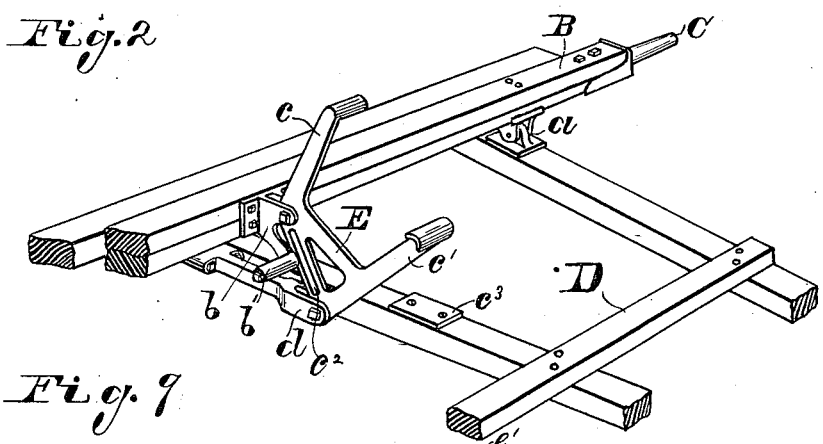
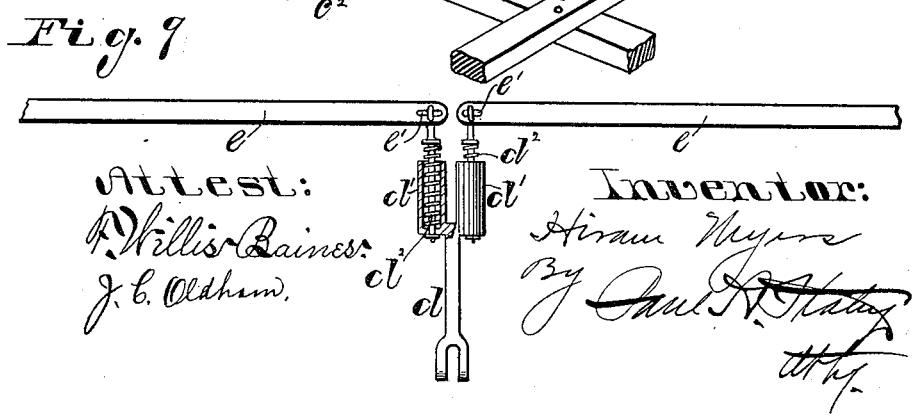
Attest:
R. Willis Baines.
J. C. Oldham.
Inventor:
Hiram Myers
By (No Model.) 2 Sheets—Sheet 2.

H. MYERS.
HORSE HAY RAKE.

No. 360,039. Patented Mar. 29, 1887.

Attest:
Willis Raines
J. E. Oldham

Inventor:
Hiram Myers
By Daniel H. Staley
Atty.

United States Patent Office.

HIRAM MYERS, OF SPRINGFIELD, OHIO.

HORSE HAY-RAKE.

SPECIFICATION forming part of Letters Patent No. 360,039, dated March 29, 1887

Application filed January 20, 1886. Serial No. 159,213. (No model.)

*To all whom it may concern:*

Be it known that I, HIRAM MYERS, a citizen of the United States, residing at Springfield, in the county of Clark and State of Ohio, have invented certain new and useful Improvements in Hay-Rakes, of which the following is a specification.

My invention relates to that class of hay-rakes in which means are provided for connecting the rake-head to the carrying-wheels when a sufficient load has accumulated, so that as the rake is drawn forward the load will be automatically dumped; and it particularly relates to those rakes in which pawls or levers on the rake-head are adapted to engage with ratchets turning with the carrying-wheels to raise the rake-teeth.

The object of my invention is to provide a novel arrangement of the pawl-levers and their connections, whereby the rake-teeth may be raised by either or both wheels moving in a forward direction, the said wheels being adapted to turn backward or forward together, or independently of each other, without detriment to the connecting mechanism.

My invention consists in the constructions and combinations of parts, hereinafter described and claimed.

Figure 3:
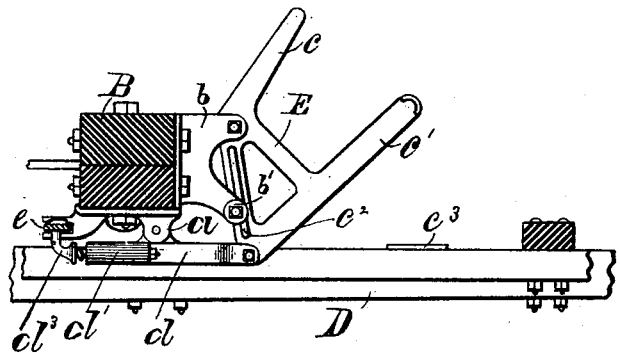
Figure 6:
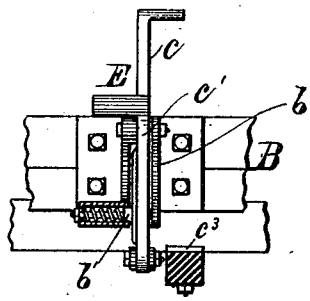
Figure 4:
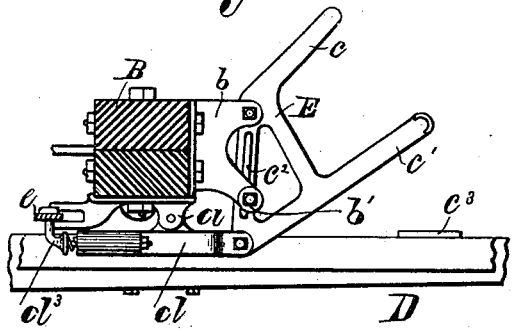
Figure 5:
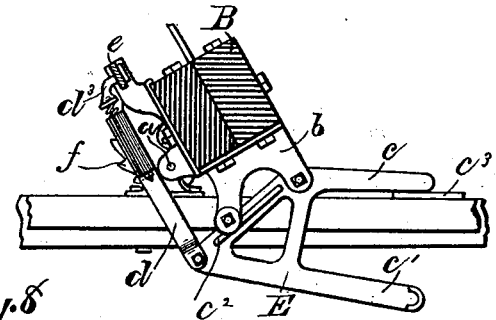
Figure 8:
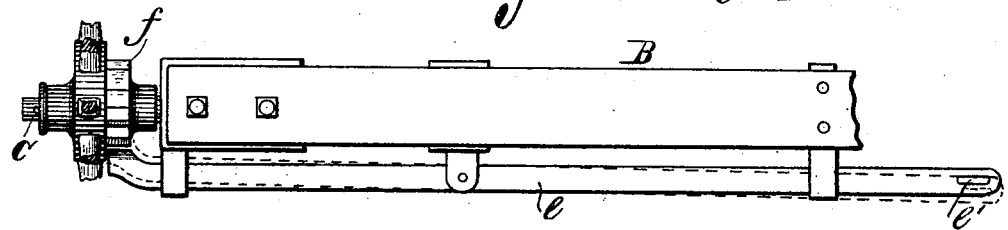
Figure 10:
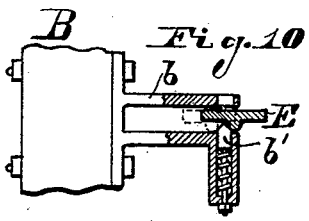

In the accompanying drawings, Figure 1 is a plan view of a rake embodying my invention. Fig. 2 is a perspective view of a portion of the frame-work of the same, showing the tripping mechanism. Figs. 3, 4, and 5 are transverse sectional views of the rake-head and connecting mechanism in different positions in dumping. Figs. 6 to 10, inclusive, are detailed views of the clutching mechanism.

In said drawings, A A represent the carrying-wheels, and B the rake-head, to which the rake-teeth are secured in the usual way. The rake-head B is provided at either end with trunnions or journals C C, which are secured thereto in any suitable manner, and on which the carrying-wheels A A are adapted to turn. The rake-head B is thus also adapted to form the axle, and the shafts D are hinged thereto, as shown at $a$, in any suitable manner.

On the front of the rake-head B, at or near the middle of its length, is a bifurcated clip, $b$, which is provided on one of its arms with a small spring-bolt, $b'$, (see Fig. 10,) preferably inclosed in a spring-case formed on the clip $b$.

Pivoted in the bifurcated clip $b$ is a double-pronged lever, E, which I term the "trip-lever." This trip-lever has two upwardly-extending arms, $c$ and $c'$, and is provided on one side thereof, near the bottom, with a small longitudinal rib, $c^2$, with which the spring-bolt $b'$ is adapted to engage on either side. Each of these arms $c$ $c'$ is provided at its outer end with a projection at right angles thereto, which projections extend in opposite directions from the respective arms. The projection on the arm $c'$ is adapted to receive the foot of the operator, while the projection on the arm $c$ is adapted to come in contact with a plate, $c^3$, on the shaft-frame D in dumping the load, as hereinafter more fully explained.

Pivoted to the trip-lever E, at the lower corner thereof, is a connecting-link, $d$, which is bifurcated at its rear end and connected to the inner ends, respectively, of two longitudinal pivoted pawl-levers, $e$ $e$, which are adapted to engage at their outer ends with ratchet-wheels $f f$, respectively, on the carrying-wheels A A.

The teeth of the ratchet-wheels $f f$ are adapted to engage with the levers $e$ $e$ when turned in a forward direction only. The said levers, when in their normal position, stand out of engagement with the ratchet-wheels, in which case the trip-lever is in the position shown in Fig. 3. Now, by pressing on the arm $c'$ of the trip-lever E until the rib $c^2$ thereon is forced past the spring-bolt $b'$, as shown in Fig. 4, the levers $e$ $e$, through the medium of the connecting-link $d$, will be forced into engagement with the ratchet-wheels $f$ $f$, which, when the rake is drawn forward, will cause the rake-head to turn therewith, thus raising the rake-teeth and dumping the load.

Now, in order that the wheels may turn independently when the levers are connected for dumping, as in turning corners, where one wheel turns faster than the other, or one wheel turns backward while the other turns forward, I provide a yielding connection between the connecting-link $d$ and each of the levers $e$ $e$, so that in turning backward either one or both of the levers will yield away from the ratchet-wheels, but will engage therewith at once when the ratchets are turned forward. I preferably accomplish this by providing in the bifurcated link two spring-pockets, $d'\,d'$. In each of these pockets is a spring, $d^2$, which bears at one end against the bottom of the spring-pocket and at the other against a shoulder on a connecting-bolt, $d^3$, which passes entirely through the spring and pocket, and is provided at its inner end with a suitable head (preferably a screw-nut) on the end thereof. These connecting-bolts $d^3$ are connected at their outer ends to the respective levers $e\,e$, and for this purpose are preferably provided with T-shaped heads, adapted, when turned to an unusual position, to pass through slotted openings $e'$ in said lever, the said T-shaped heads being turned across said slotted openings, and thus held therein when the bolts are turned to a working position. (See Fig. 9.)

The trip-lever E is located within easy reach of the operator. When a sufficient load has accumulated in the rake, he places his foot on the arm $c'$ and presses down thereon until the rib $c^2$ is forced past the spring-bolt $b'$, as before described. The pressure of the springs $d^2$ is thus brought against the levers $e\,e$, which forces them against the ratchets $f\,f$. If the rake is moving forward in a straight line, both the levers are engaged by the ratchets, thus turning the rake-head until the arm $c$ comes against the plate $c^3$ on the frame D, as shown in Fig. 5, which forces the trip-lever back until the rib again passes the spring-bolt $b'$ to its normal position, thus withdrawing the levers $e\,e$ and releasing the rake-head, which returns by gravity to its normal position. In case one wheel is turning faster than the other, or is turning backward while the other is turning forward, the ratchet-wheel which is turning fastest and in a forward direction does the dumping, while by means of the yielding connection the lever engaged with the other ratchet moves forward thereon.

Figure 7:
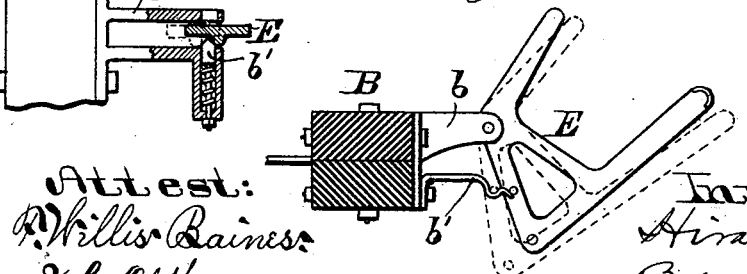

In Fig. 7 a modified form of the spring-catch for the trip-lever is shown. A simple spring having a recess therein adapted to engage a pin on the lever being substituted for the spring-bolt, it is obvious that other modifications may be employed without departing from the spirit of my invention.

Having thus described my invention, I claim—

1. The combination, with the ratchet-wheels, the rake-head, and the longitudinal levers pivoted on said rake-head and adapted to engage at their outer ends with the respective ratchet-wheels, of a trip-lever and a bifurcated connecting-link attached thereto, said connecting-link being provided with spring-pockets having springs therein connected independently to the inner ends of the respective levers, substantially as and for the purpose set forth.

2. The combination, with the ratchet-wheels and the longitudinal levers on the rake-head adapted to engage therewith, of the trip-lever E, a spring-catch adapted to engage therewith, and a connecting-link adapted to form an elastic connection from each of said pawl-levers to the trip-lever, substantially as set forth.

3. The combination, with the ratchet-wheels and the pawl-levers adapted to engage with said ratchets and having the slotted openings therein, of the link $d$, springs $d^2$, and the connecting-bolts having the T-shaped heads adapted to pass through said slotted openings, substantially as described.

4. The combination, with the carrying-wheels and the ratchets thereon, of the rake-head, the pawl-levers pivoted to said rake-head and extending longitudinally along the same to a point at or near the middle thereof, the connecting-link having the springs therein connected to said levers, the trip-lever E, having arms $c\,c'$, spring-catch $b'$, and stop $c^3$, substantially as specified.

5. The combination, with the rake-head, the longitudinal pawl-levers, and ratchets, of the clip $b$, spring-bolt $b'$ therein, a trip-lever, E, having arms $c\,c'$ and lug $c^2$, and stop $c^3$, said trip-lever being connected by a bifurcated spring connecting-link to the longitudinal pawl-levers on the said rake-head, substantially as and for the purpose set forth.

In testimony whereof I have hereunto set my hand this 14th day of January, A. D. 1886.

HIRAM MYERS.

Witnesses:
F. WILLIS BAINES,
PAUL A. STALEY.